United States Patent [19]

Hank et al.

[11] Patent Number: 4,693,126

[45] Date of Patent: Sep. 15, 1987

[54] FEED ROLL FOR MATERIAL WEB TRANSPORTING AND MEASURING WEB TENSION

[75] Inventors: Dietrich Hank; Kerstin Hauer, both of Leipzig, German Democratic Rep.

[73] Assignee: VEB Kombinat Polygraph "Werner Lamberz" Leipzig, Leipzig, German Democratic Rep.

[21] Appl. No.: 862,307

[22] Filed: May 8, 1986

[30] Foreign Application Priority Data

Jul. 26, 1985 [DD] German Democratic Rep. .................................. 2790132

[51] Int. Cl.$^4$ .............................................. G01L 5/10
[52] U.S. Cl. .............................................. 73/862.48
[58] Field of Search ........... 73/862.39, 862.42; 862.44, 73/862.45, 862.47, 862.48, 862.19, 862.31

[56] References Cited

U.S. PATENT DOCUMENTS 3,352,152 11/1967 Abraham ........................... 73/862.44

FOREIGN PATENT DOCUMENTS 1086246 8/1960 Fed. Rep. of Germany .
1129965 5/1962 Fed. Rep. of Germany .
2356009 5/1975 Fed. Rep. of Germany .

OTHER PUBLICATIONS

R. Ruder and R. Störr, "Papier und Druck" 30, 1981, 2, Teil Druck und Verarbeitung, pp. 17 to 21.

Primary Examiner—Charles A. Ruehl
Attorney, Agent, or Firm—Michael J. Striker

[57] ABSTRACT

A feed roll for transporting a material web and measuring a web tension of the material web which is continually moved in a roller rotary printing machine. The feed roll is rotationally supported at both sides in two levers which are pivotably arranged in the frame of the machine. A force acting on the axis of the feed roll and proportional to a web tension is measured by a measure value-receiver which detects a path of movement of a translating lever rigidly connected to at least one of the pivotable levers.

4 Claims, 4 Drawing Figures

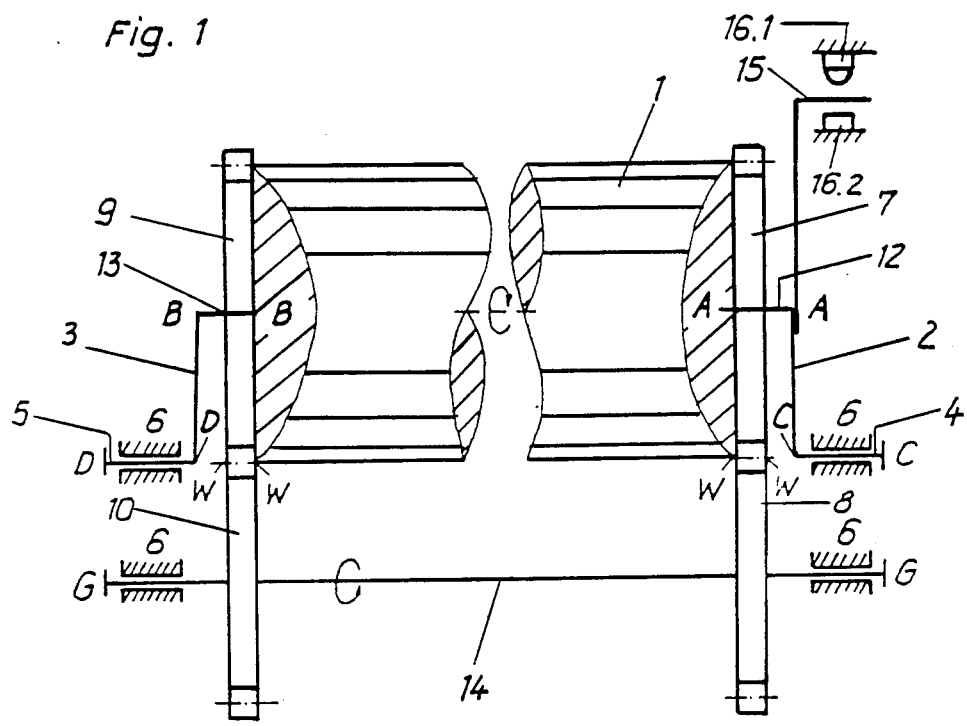
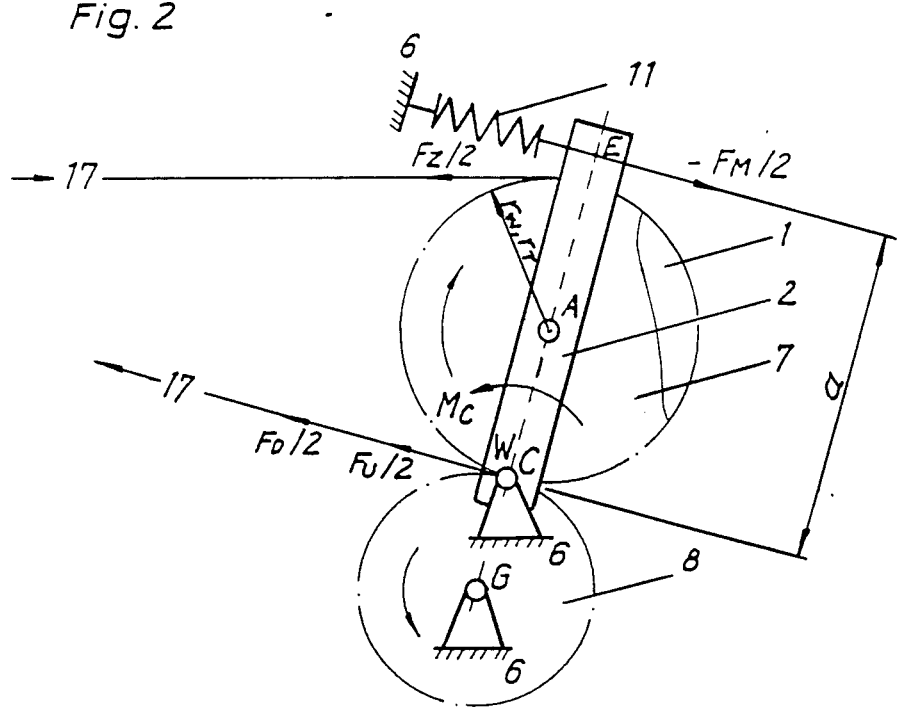

FEED ROLL FOR MATERIAL WEB TRANSPORTING AND MEASURING WEB TENSION

BACKGROUND OF THE INVENTION

The present invention relates to a feed roll for transporting a material web and measuring a tension of a continually movable material web.

Feed rolls of the type under discussion are utilized in roller rotary printing machines in which a paper tape must be moved in register, and automatic control, adjusting, examining and testing devices are required for this purpose in connection with web transporting devices.

For measurements of the web tension and adjustments of this tension in contemporary roller rotary printing machines are required direct and reliable measuring devices. These requirements are generally fulfilled by known devices in which web tension is determined with the aid of force value-receivers positioned at two sides of the web-guiding roller supported in the bearings. Such force value-receivers can be formed with semi-conductive strain gauge strips, which have been disclosed, for example in DE-PS No. 2,356,009.

The measurement of the tension of the material moved between the printing mechanisms or between the last printing mechanism and the cooling roller aggregate is not possible with conventional devices in which the web-guiding roller is in contact with the outer surface of the movable web because of supplying of a fresh printing ink. Measurement of the web tension as seen in the direction of running of the web, before or behind each processing station, however ensures a loop-free web transportation and therefore registered movement thereof.

Pneumatically-operating devices for measuring the web tension have been also known. In the device disclosed in DE-PS No. 1,129,965, air stream supplied from the nozzles of the container, arranged above or below the movable paper web, and directed against the web causes the deflection of the web in dependence upon the web tension. In order to avoid undesired reactions from the deflection of the web due to change in the distance between the deflected web and the stationarily-positioned nozzles it is also required that the nozzles be reset to change intensity and direction components of the air stream. This has required an automatic control system for a position control.

Further known is a pneumatic device for measuring web tension, in which device an air stream supplied from the nozzles is throttled by the web and a pressure change in dependence upon the web tension is measured. Such a device has been disclosed by R. Ruder, R. Stött, in "Papier und Druck", 30, 1981, 2, "Teil Druck und Verarbeitung", pages 17 to 21.

A paper web is guided, for example over a stationary curved table. From the container positioned below the table air is supplied from a pressure air source under constant pressure. Air outlet openings open in the table over the entire width of the web. These openings are covered by the web. Depending upon the web tension air escapes, and a respective pressure in the container is adjusted.

A small distance between the web and the table does not preclude lubricating with a fresh printing ink, particularly with web fluttering.

A common disadvantage of all pneumatic devices resides in that providing a supply of purified pressure air of constant pressure is relatively expensive.

The lubricating of the fresh print has little influence on the quality of the printing when the length of winding off portion of the roll which is in contact with the upper surface of the movable web is the same or many times greater than the length of the winding off portion of the printing plate cylinder. If the roll positioned in contact with the web is driven not by friction, as is the case with the web-guiding roll, but is driven by the machine and therefore is mechanically connected with the printing plate cylinder the ink lubrication influence is insignificant. It has been therefore recognized that the feed rolls must be arranged behind the last printing mechanism as seen in the direction of course of printing.

An adjuster of web tension has been disclosed in DE-PS No. 1,086,246. In this adjuster, a pair of feed rolls coupled to the machine drive via a pulling drive or transmission are provided. A swinging frame is arranged below this pair of feed rolls, which frame is biased by a counter spring, and a transmission ratio of the drive transmission would be controlled by an oscillating or swinging movement of that frame, which movement depends upon the web tension. The adjustment of this arrangement takes place in a static condition so that web-pulling forces, forces of the pulling means and a restoring force are in equilibrium, and thereby no torque occurs with reference to the swinging frame. A change in a web tension causes a proportional deflection of the swinging frame. This equilibrium condition permits to use the feed roll which transports the web without the counter roll with friction and/or pressing and must be driven by the tooth gear drive or the drive including a pulling means, such as a belt drive or chain drive.

SUMMARY OF THE INVENTION

It is an object of the present invention to provide an improved feed roll.

It is another object of the invention to provide a feed roll with a device for measuring a force acting on the feed roll and caused by the web tension.

These and other objects of this invention are attained by a feed roll for transporting a material web and measuring a tension of a continually movable material web, the feed roll being in contact with an outer surface of the web due to the web tension and wrapping of the web around the roll) comprising two levers each positioned at one side of the feed roll so that the feed roll is rotatably and friction-free supported in said levers; said levers being pivotally supported in a machine frame and having axes of rotation (C—C,D—D)which lie on the same straight line and extend through a point of action of a pulling force ($F_D$) of a portion of the material web the web tension of which is not measured and also through a point on a line of action of all resulting drive forces for the feed roll; means for returning said levers to initial positions; and a measure value-receiver corresponding to at least one of said levers and rigidly arranged in the machine frame, said measure value-receiver measuring an amount of pivoting of said at least one lever, proportional to the web tension in a running portion of the movable material web.

In a modified embodiment, the roll may be provided with a tooth gear drive which drives the feed roll in accordance with the position of rotation axes of the gear drive, said drive being a spur gear drive, said axes of rotation of said levers being parallel to a peripheral line extending through a roll point and through a point on a line of engagement of an evolvent toothing of the spur gear drive.

In accordance with a further modification the feed roll may be provided with a pulling drive for driving the feed roll and applying to the feed roll a pulling drive force ($F_{S1}$) of a drawn pulling drive portion, a line of action of said pulling drive force and a line of action of a pulling force ($F_{D/2}$) of a portion of the movable material web the web tension of which is not measured lying in the same straight line, a line of action of a pulling drive force ($F_{S2}$) of a non-drawn portion of the pulling drive having a point of intersection with a line of action of the pulling drive force ($F_{S1}$) of the drawn pulling drive portion, and said axes of rotation of said levers being parallel to an axis of rotation of the feed roll and extending through a point of intersection of the lines of action of the pulling drive forces ($F_{S1}$, $F_{S2}$).

The feed roll arrangement may include drive means for continual rotation movements of the feed roll, said drive means being rigidly connected to at least one of said levers.

In yet another embodiment of the invention at least one of said levers may have a one-arm translating lever rigidly connected to said one lever, said receiver being a position-sensitive optoelectric sensor including a light transmitter and a light detector and being arranged in said machine frame so that an optical path of said receiver is positioned within a range of movement of a freely movable end of said translating lever.

The movable material web generates, due to a web tension and wrapping of the web around the roll, a resulting force acting on the axis of rotation of the feed roll and normal to that axis, said resulting force, due to journalling of the feed roll in two levers, generating a torque, the vector of which lies on the axis of rotation of each lever and rotates the levers against the restoring moment. The angle of rotation of the levers is proportional to the web tension and this angle is measured by the measure value-receiver.

Inasmuch as the axes of rotation of the levers extend through the point on the line of action of the pulling force of the portion of the web, the tension of which is not being measured, no torque exists for this pulling force relative to the axes of rotation of the levers. Since these axes of rotation of the levers also extend through the point on the line of action of the drive force or resulting drive forces for the feed roll, no torque exists for the drive force or resulting drive forces relative to the axes of rotation of the levers either.

If the feed roll is driven by the drive rigidly connected to one or both levers, for example by an electric motor, to provide continual rotation movements of the roll and an immediate application of the torque corresponds to the drive of the feed roll no torque-forming drive forces occur relative to the axes of rotation of the levers.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. 1 is a schematic front view of the feed roll according to the invention;

FIG. 2 is a schematic side view of the feed roll driven at two sides by a spur gear drive, wherein the axes of rotation of the levers extend through the axis of the roll;

DETAILED DESCRIPTION OF THE PREFERRED EMBODIMENTS

Figure 3:
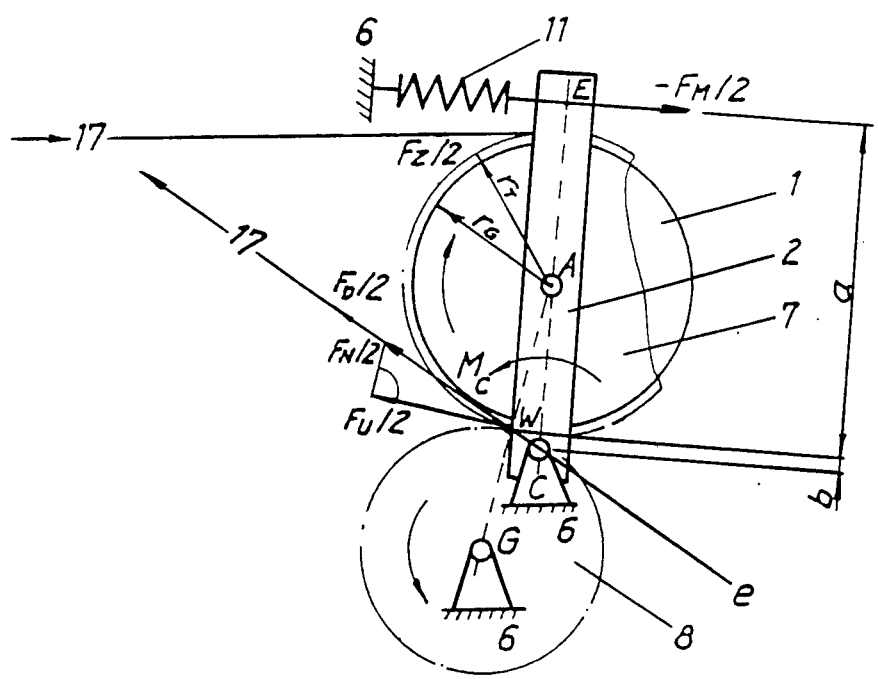
FIG. 3 is a schematic view of the feed roll with the spur gear drive, wherein the axes of the levers extend through the points on the engagement line.

Referring now to the drawings in detail, and firstly to FIGS. 1 and 2 thereof, a feed roll is rotationally and friction-free supported between respective levers 2 and 3. Levers 2 and 3 are in turn pivotally supported in a machine frame 6. The axis of rotation C—C and the axis of rotation D—D of lever 2 and 3, respectively, lie in the same straight line and extend through a point on the line of action of the feeding force $F_D$ of the web portion running with a web tension and also through the roll point W which is a point of application of the peripheral force Fu generated by the torque in the spur gear drive 7, 8; 9, 10. A compression spring 11 is provided for each lever to return the same to the initial position. Spring 11 is in the position that the release moment of the rotation-fixed-connected levers 2 and 3 is produced.

To measure the amount of rotation of levers 2, 3, proportional to the web tension, a measure value-receiver 16 is rigidly arranged in the machine frame 6. The position of measure value receiver 16 in the machine frame 6 can be adjusted. A one-arm lever 15, which is rigidly connected to the lever 2 and operated to translate the rotation of that lever, cooperates with the measure value-receiver 16 which is a position-sensitive optoelectronic sensor comprised of a light transmitter 16.1 and a light detector 16.2. The optoelectronic sensor and lever 15 are arranged so that an optical path is located in the range of movement of the free end of the translating lever 15.

The movable web 17 causes, due to a web tension and the wrapping of the web about roll 1, a resulting force on the axis of rotation A-B of the feed roll, said force being normal to the axis A-B and producing via a two-side eccentric bearing in the levers 2, 3, a torque Mc, the vector of which lies in the rotation axes C—C, D—D of levers 2, 3 and which rotates levers 2, 3 against the restoring torque generated by the force of the compression spring 11. By means of the translating lever 15 rigidly connected to the lever 2, a rotation angle, which is proportional to a web tension of a supply web portion, is translated with a factor greater than 1 and is measured in a contactless manner by means of the measure value-receiver 16.

Inasmuch as the axes of rotation C—C and D—D of levers 2 and 3, respectively, extend through the point on the line of action of the feeding force $F_D$ of the web portion with the web tension, which is not measured, no torque exists for the feeding force $F_D$ in reference to the rotation axes C—C, D—D of levers 2, 3, and because the rotation axes C—C and D—D of levers 2 and 3 also extend through the roll point W, e.g. the point of application of the peripheral force Fu generated by the drive moment, no torque exists for the peripheral force Fu in reference to the axes C—C, D—D of levers 2 and 3.

FIG. 3 illustrates a modified embodiment. The difference between the embodiment shown in FIG. 3 and that of FIGS. 1 and 2 is that rotation axes C—C and D—D of levers 2 and 3, respectively extend not through the roll point W but through a random point of the line of engagement C (evolvent toothing) of the spur gear drive 7, 8; 9, 10. Since the rotation axes C—C and D—D of levers 2 and 3 extend through the point on the line of action of the tooth normal force $F_N$ generated by the drive torque, no torque exists for the tooth normal force $F_N$ in reference to the rotation axes C—C, D—D of levers 2,3.

Figure 4:
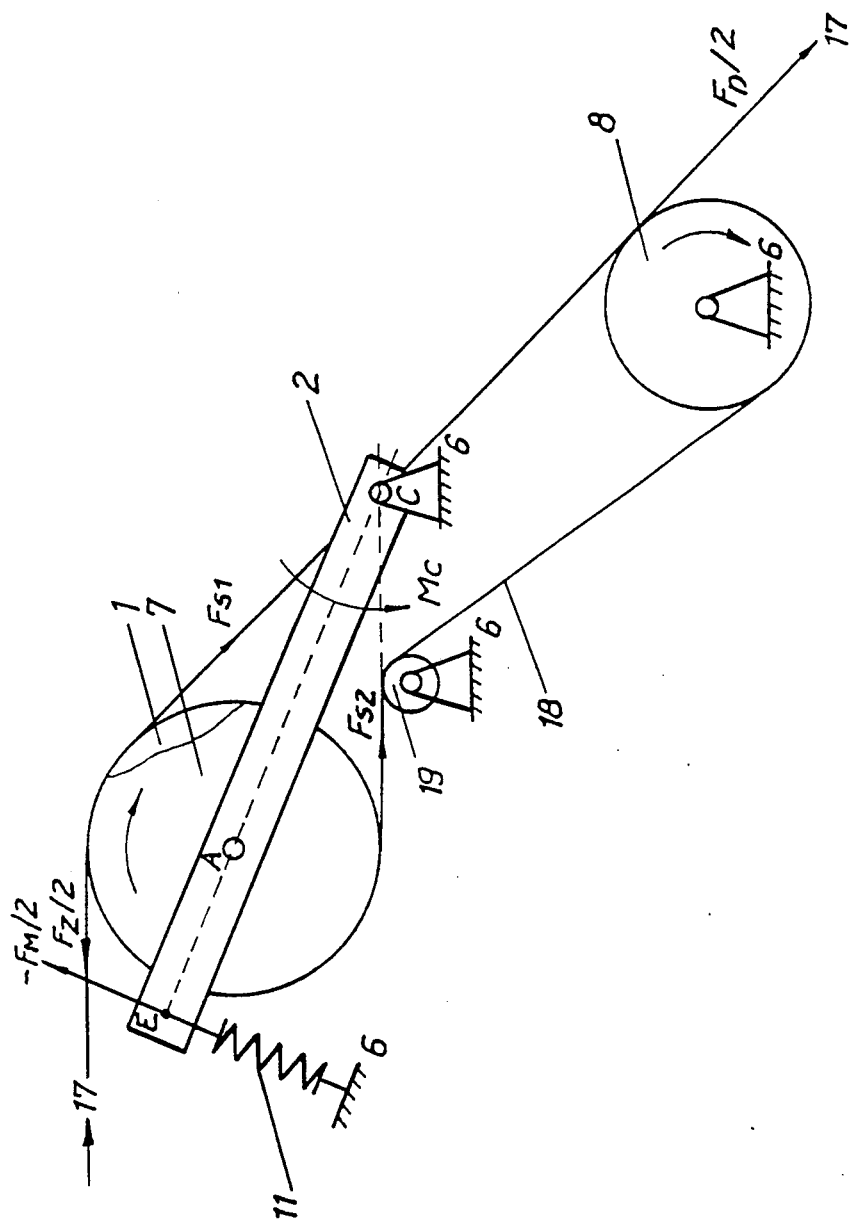
FIG. 4 is a schematic view of the feed roll of the invention driven by a pulling drive.

A further modification is depicted in FIG. 4. This embodiment differs from those shown in FIGS. 1 to 3 in that the feed roll 1 is driven at one side thereof by pulling type-drive. The pulling means which can be a belt is denoted by reference numeral 18. The axes of rotation C—C and D—D of levers 2 and 3 extend through the point on the line of action of the pulling or feeding force $F_{D/2}$ of the running web portion with the web tension not measured herein and also through the point of intersection of the lines of action of the forces $F_{S1}$ and $F_{S2}$ of the pulling means.

Inasmuch as the axes of rotation C—C and D—D of levers 2 and 3 extend through the point on the line of action of the resulting forces $F_{S1}$, $F_{S2}$ of the pulling means no torque exists for these forces with reference to axes C—C and D—D of levers 2,3.

It will be understood that each of the elements described above, or two or more together, may also find a useful application in other types of feed rolls differing from the types described above.

While the invention has been illustrated and described as embodied in a feed roll, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention. What is claimed as new and desired to be protected by Letters Patent is set forth in the appended claims.

We claim:

1. In a feed roll for transporting a material web and measuring a tension of a continually movable material web, the feed roll being in contact with an outer surface of the web due to the web tension and wrapping of the web around the roll the improvment comprising two levers (2,3) each positioned at one side of the feed roll so that the feed roll is rotatably and friction-free supported in said levers; said levers being pivotally supported in a machine frame and having axes of rotation (C—C, D—D) which lie on the same straight line and extend through a point of action of a pulling force ($F_D$) of a portion of the movable material web the web tension of which is not measured and also through a point on a line of action of all resulting drive forces for the feed roll; means for returning said levers to initial positions; and a measure value-receiver (16) corresponding to at least one of said levers and rigidly arranged in the machine frame, said measure value-receiver measuring an amount of pivoting of said at least one lever, proportional to the web tension in a running portion of the movable material web.

2. The feed roll as defined in claim 1; further including a tooth gear drive which drives the feed roll in accordance with the position f rotation axes (A—A, B—B, G—G) of the gear drive, said drive being a spur gear drive, said axes of rotation (C—C, D—D) of said levers being parallel to a peripheral line (W—W) extending through a roll point (W) and through a point on a line of engagement (E) of an evolvent toothing of the spur gear drive (7, 8: 9, 10).

3. The feed roll as defined in claim 1, further including a pulling drive for driving the feed roll and applying to the feed roll a pulling drive force ($F_{S1}$) of a drawn pulling drive portion, a line of action of said pulling drive force and a line of action of a pulling force ($F_{D/2}$) of a portion of the movable material web the web tension of which is not measured, lying in the same straight line, a line of action of a pulling drive force ($F_{S2}$) of a non-drawn portion of the pulling drive having a point of intersection with a line of action of the pulling drive force ($F_{S1}$) of the drawn pulling drive portion, and said axes of rotation (C—C, D—D) of said levers being parallel to an axis of rotation of the feed roll and extending through a point of intersection of the lines of action of the pulling drive forces ($F_{S1}$, $F_{S2}$).

4. The feed roll as defined in claim 1, wherein at least one of said levers has a one-arm translating lever (15) rigidly connected to said one lever, said measure-value receiver being a position-sensitive optoelectronic sensor (16) including a light transmitter (16.1) and a light detector (16.2) and being arranged in said machine frame so that an optical path of said receiver is positioned within a range of movement of a freely movable end of said translating lever.

* * * * *